US008997528B2

(12) United States Patent
Fabian et al.

(10) Patent No.: US 8,997,528 B2
(45) Date of Patent: Apr. 7, 2015

(54) METHOD FOR PRODUCING SYNTHETIC QUARTZ GLASS

(71) Applicant: Heraeus Quarzglas GmbH & Co. KG, Hanau (DE)

(72) Inventors: Heinz Fabian, Grossostheim (DE); Juergen Roeper, Roitzsch (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 13/684,381

(22) Filed: Nov. 23, 2012

(65) Prior Publication Data
US 2013/0133377 A1    May 30, 2013

Related U.S. Application Data

(60) Provisional application No. 61/569,151, filed on Dec. 9, 2011.

(30) Foreign Application Priority Data

Nov. 25, 2011    (DE) .................. 10 2011 119 341

(51) Int. Cl.
*C03B 37/018*    (2006.01)
*C03B 20/00*    (2006.01)
(Continued)

(52) U.S. Cl.
CPC .............. *C03B 20/00* (2013.01); *C03B 37/012* (2013.01); *C03B 37/01413* (2013.01); *C03B 19/1415* (2013.01); *C03B 2207/32* (2013.01); *C03B 2207/85* (2013.01)

(58) Field of Classification Search
CPC ............ C03B 2201/02; C03B 19/1415; C03B 37/01413; C23C 16/402; C23C 16/4486
See application file for complete search history.

(56) References Cited

U.S. PATENT DOCUMENTS

| 2,552,247 A | 5/1951 | Wormuth et al. |
| 3,274,154 A | 9/1966 | Kendrick et al. |

(Continued)

FOREIGN PATENT DOCUMENTS

| DE | 2435704 | 2/1976 |
| DE | 3500080 A1 | 7/1986 |

(Continued)

OTHER PUBLICATIONS

Dow Corning 244 Fluid MSDS, Dow Corning, Material Safety Data Sheet, Nov. 2001.*

(Continued)

*Primary Examiner* — Lisa Herring
(74) *Attorney, Agent, or Firm* — Tiajoloff and Kelly LLP

(57) ABSTRACT

A known method for producing synthetic quartz glass comprises the method steps of: forming a stream of a $SiO_2$ feedstock material which contains octamethylcyclotetrasiloxane (D4) as the main component which has a reference molecular mass assigned to it, feeding the stream to a reaction zone in which the feedstock material is converted under formation of amorphous $SiO_2$ particles by pyrolysis or hydrolysis into $SiO_2$, depositing the amorphous $SiO_2$ particles on a deposition surface while forming a porous $SiO_2$ soot body, and vitrifying the $SiO_2$ soot body while forming the synthetic quartz glass. Starting therefrom, to enable the production of large-volume cylindrical soot bodies with outer diameters of more than 300 mm of improved material homogeneity, it is suggested according to the invention that the feedstock material contains additional components in the form of further polyalkylsiloxanes, wherein light polyalkylsiloxanes with a relative molecular mass of less than the reference molecular mass are contained with a weight fraction of at least 50 ppm, and heavy polyalkylsiloxanes with a relative molecular mass of more than the reference molecular mass are contained with a weight fraction of at least 30 ppm.

15 Claims, 6 Drawing Sheets

(51) Int. Cl.
*C03B 37/012* (2006.01)
*C03B 37/014* (2006.01)
*C03B 19/14* (2006.01)

(56) References Cited

U.S. PATENT DOCUMENTS

| | | | |
|---|---|---|---|
| 3,332,974 A | 7/1967 | Bostick | |
| 3,493,533 A | 2/1970 | Bailey et al. | |
| 3,629,309 A | 12/1971 | Bailey et al. | |
| 3,903,047 A | 9/1975 | Ashby | |
| 3,978,104 A | 8/1976 | Razzano | |
| 3,998,865 A | 12/1976 | Siciliano et al. | |
| 4,022,152 A | 5/1977 | Laufer et al. | |
| 4,096,160 A | 6/1978 | Ashby | |
| 4,158,092 A | 6/1979 | Botsch et al. | |
| 4,220,460 A | 9/1980 | Partus | |
| 4,556,726 A * | 12/1985 | Reedy et al. | 556/460 |
| 4,563,513 A | 1/1986 | Inomata | |
| RE32,107 E | 4/1986 | January | |
| 4,613,380 A | 9/1986 | Chen | |
| 4,704,271 A | 11/1987 | Hourihan et al. | |
| 4,720,353 A | 1/1988 | Bell | |
| 4,824,985 A | 4/1989 | Goodwin et al. | |
| 4,847,069 A | 7/1989 | Bissett et al. | |
| 4,847,071 A | 7/1989 | Bissett et al. | |
| 4,847,072 A | 7/1989 | Bissett et al. | |
| 4,869,897 A | 9/1989 | Chatterjee et al. | |
| 4,889,845 A | 12/1989 | Ritter et al. | |
| 4,892,890 A | 1/1990 | Damani | |
| 4,946,671 A | 8/1990 | Bissett et al. | |
| 4,948,578 A | 8/1990 | Burger et al. | |
| 4,954,332 A | 9/1990 | Bissett et al. | |
| 4,954,335 A | 9/1990 | Janchipraponvej | |
| 4,961,753 A | 10/1990 | Donkers et al. | |
| 5,021,221 A | 6/1991 | Gould et al. | |
| 5,039,513 A | 8/1991 | Chatterjee et al. | |
| 5,043,002 A * | 8/1991 | Dobbins et al. | 65/386 |
| 5,049,617 A | 9/1991 | Yoshioka et al. | |
| 5,143,661 A | 9/1992 | Lawter et al. | |
| 5,152,819 A * | 10/1992 | Blackwell et al. | 65/386 |
| 5,154,744 A | 10/1992 | Blackwell et al. | |
| 5,210,129 A | 5/1993 | de la Croi Habimana et al. | |
| 5,211,732 A | 5/1993 | Abbott et al. | |
| 5,232,689 A | 8/1993 | Katsoutlis et al. | |
| 5,250,278 A | 10/1993 | Schuette et al. | |
| 5,270,036 A | 12/1993 | Varaprath et al. | |
| 5,275,761 A | 1/1994 | Bergmann | |
| 5,279,818 A | 1/1994 | Halloran et al. | |
| 5,292,530 A | 3/1994 | McCrea et al. | |
| 5,300,285 A | 4/1994 | Halloran et al. | |
| 5,302,382 A | 4/1994 | Kasprzak | |
| 5,308,551 A | 5/1994 | Beauquey et al. | |
| 5,326,557 A | 7/1994 | Glover et al. | |
| 5,330,747 A | 7/1994 | Krzysik | |
| 5,338,535 A | 8/1994 | Berndt | |
| 5,356,451 A | 10/1994 | Cain et al. | |
| 5,358,667 A | 10/1994 | Bergmann | |
| 5,391,674 A | 2/1995 | Hara et al. | |
| 5,399,649 A | 3/1995 | Okawa | |
| 5,403,402 A | 4/1995 | LeGrow | |
| 5,426,168 A | 6/1995 | Witucki | |
| 5,443,607 A | 8/1995 | Englisch et al. | |
| 5,473,037 A | 12/1995 | Itoh et al. | |
| 5,508,369 A | 4/1996 | Yamazaki et al. | |
| 5,562,945 A | 10/1996 | Hijino et al. | |
| 5,632,797 A | 5/1997 | Williams | |
| 5,703,191 A | 12/1997 | Henderson et al. | |
| 5,735,921 A | 4/1998 | Araujo et al. | |
| 5,735,928 A | 4/1998 | Sayce et al. | |
| 5,790,315 A | 8/1998 | Fujinoki et al. | |
| 5,879,649 A * | 3/1999 | Henderson et al. | 423/337 |
| 5,938,853 A * | 8/1999 | Williams | 118/726 |
| 5,970,746 A | 10/1999 | Fujinoki et al. | |
| 6,152,166 A | 11/2000 | Bauscher et al. | |
| 6,209,354 B1 | 4/2001 | Fujinoki et al. | |
| 6,982,232 B2 | 1/2006 | Borrelli et al. | |
| 7,506,521 B2 | 3/2009 | Bookbinder et al. | |
| 7,506,522 B2 | 3/2009 | Bleaking et al. | |
| 7,534,733 B2 | 5/2009 | Bookbinder et al. | |
| 7,589,039 B2 | 9/2009 | Allan et al. | |
| 8,245,543 B2 | 8/2012 | Huenermann | |
| 2001/0020448 A1 | 9/2001 | Vaartstra et al. | |
| 2003/0116091 A1 * | 6/2003 | Grant et al. | 118/726 |
| 2006/0107693 A1 | 5/2006 | Trommer et al. | |
| 2010/0132406 A1 | 6/2010 | Huenermann | |
| 2010/0276291 A1 * | 11/2010 | Durrer et al. | 205/83 |
| 2012/0276291 A1 | 11/2012 | Bird et al. | |

FOREIGN PATENT DOCUMENTS

| | | |
|---|---|---|
| DE | 4029071 A1 | 3/1992 |
| DE | 4204406 A1 | 8/1993 |
| DE | 195 01 733 C1 | 5/1996 |
| DE | 10302914 A1 | 8/2004 |
| DE | 102007024725 A1 | 11/2008 |
| EP | 463045 | 1/1992 |
| EP | 0622452 A1 | 4/1994 |
| EP | 0622452 A1 | 11/1994 |
| EP | 673888 A1 | 3/1995 |
| EP | 908418 A1 | 3/1999 |
| EP | 1329429 | 7/2003 |
| JP | H04505149 | 9/1992 |
| JP | 6-292868 | 10/1994 |
| WO | 9010596 A1 | 9/1990 |
| WO | 2004065314 A1 | 8/2004 |

OTHER PUBLICATIONS

Espacenet English language abstract of DE 102007024725 A1, published Nov. 27, 2008.
Espacenet English language abstract of DE 4204406 A1, published Aug. 26, 1993.
Espacenet English language abstract of DE 10302914 A1, published Aug. 12, 2004.
English Translation of JP 6-292868, date unknown, submitted Oct. 2014.
Espacenet English language abstract of DE 3500080 A1, published Jul. 10, 1986.
Dow Corning(R) 244 Fluid (German Language edition), version 3.10, updated Jul. 2, 2008.
"Information about Volatile Silicone Fluids", Dow Corning Corporation, 1982.
Dow Corning(R) 244 Fluid Material Safety Data Sheet, version 2.6, updated Jul. 13, 2007.

* cited by examiner

METHOD FOR PRODUCING SYNTHETIC QUARTZ GLASS

RELATED APPLICATION

This application claims the benefit of U.S. provisional application Ser. No. 61/569,151 filed Dec. 9, 2011 which is herein incorporated in its entirety by reference.

FIELD OF THE INVENTION

The present invention relates to a method for producing synthetic quartz glass, comprising the steps of:
- (A) providing a liquid $SiO_2$ feedstock material (105), which contains more than 60% by wt. of the polyalkylsiloxane D4,
- (B) vaporizing the liquid $SiO_2$ feedstock material (105) into a gaseous $SiO_2$ feedstock vapor (107),
- (C) converting the feedstock vapor (107) into $SiO_2$ particles,
- (D) depositing the $SiO_2$ particles on a deposition surface (160) while forming a $SiO_2$ soot body (200),
- (E) vitrifying the $SiO_2$ soot body (200) while forming the synthetic quartz glass.

PRIOR ART

For the production of synthetic quartz glass for commercial applications, $SiO_2$ particles are produced from a silicon-containing start substance in a CVD method (chemical gas phase deposition) by hydrolysis and/or oxidation and said particles are deposited on a carrier. A distinction can here be made between outside deposition methods and inside deposition methods. In the outside deposition methods $SiO_2$ particles are applied to the outside of a rotating carrier. Examples to be mentioned here are the so-called OVD (outside vapor phase deposition) method, the VAD (vapor phase axial deposition) method or the PECVD (plasma enhanced chemical vapor deposition) method. The best known example of an inside deposition method is the MCVD (modified chemical vapor deposition) method in which $SiO_2$ particles are deposited on the inner wall of an externally heated tube.

At a sufficiently high temperature in the area of the carrier surface the $SiO_2$ particles are directly vitrified ("direct vitrification"). An example thereof is the "boule production" described in U.S. Pat. No. 5,043,002. $SiO_2$ particles are here deposited by means of deposition burners, which are directed from above into a rotating mold, and are directly vitrified so that a quartz glass body ("boule") is vertically built up from the bottom to the top in said mold.

By contrast, in the so-called "soot method" the temperature during the deposition of the $SiO_2$ particles is so low that a porous soot layer is obtained that is sintered in a separate method step into transparent quartz glass. An example thereof is the OVD method known from DE 10 2007 024 725 A1, in which a deposition burner is fed with combustion gases in the form of hydrogen and oxygen and with a silicon-containing start compound which is converted in a burner flame assigned to the deposition burner into $SiO_2$ particles which are deposited layer by layer with formation of a $SiO_2$ blank while the deposition burner is reversingly moving along a carrier rotating about its longitudinal axis.

Both direct vitrification and soot method yield a dense, transparent synthetic quartz glass of high purity.

The formation of layer structures is inherent to said production methods on account of the layerwise deposition of $SiO_2$ particles. These may be noticed as so-called striae that hint at differences in the refractive indices between neighboring layers. As a rule, a distinction can be made between cylindrical $SiO_2$ blanks with a concentric layer structure and those with an axial layer structure. In the OVD method a layer structure is e.g. produced with a spiral layer extending substantially concentrically with respect to the longitudinal axis of the blank in that $SiO_2$ particles are deposited layer by layer on the cylinder outer surface of the carrier rotating about its longitudinal axis. By contrast, in the VAD method in which a $SiO_2$ solid cylinder is built up in the direction of the longitudinal axis of the cylinder on a disc-shaped rotating carrier by axial deposition, a helical layer structure is usually obtained with axially successive layers extending in a direction perpendicular to the longitudinal axis of the cylinder.

High demands are made on the homogeneity of the refractive indices in the case of synthetic quartz glass used in microlithography or for optical components in communications engineering. Therefore, for the elimination of layers in quartz glass cylinders, multi-step deformation processes have been suggested, for instance in DE 42 04 406 A1 and EP 673 888 A1, which describes a tool-free method for homogenizing quartz glass bodies subject to striae by multidimensional compression and elongation of a softened quartz glass mass. These methods are efficient, but time-consuming and cost-intensive.

In the past silicon tetrachloride ($SiCl_4$) turned out to be useful as the silicon-containing feedstock material. $SiCl_4$ and other chlorine-containing substances already exhibit high vapor pressures at moderate temperatures below 100'C, so that possible impurities remain in the liquid phase and the manufacture of high-purity soot bodies is facilitated. On the other hand, hydrochloric acid which causes high costs in terms of flue gas scrubbing and disposal is formed during the reaction of $SiCl_4$ and other chlorine-containing feedstock materials.

Therefore, a multitude of chlorine-free feedstock materials have been tested for quartz glass production. Monosilanes, alkoxysilanes and siloxanes should be mentioned as examples. A particularly interesting group of chlorine-free feedstock materials is formed by the polyalkylsiloxanes (also shortly "siloxanes"), which are e.g. known from EP 463 045 A1. The substance group of siloxanes can be subdivided into open-chain and closed-chain polyalkylsiloxanes. The polyalkylsiloxanes have the general sum formula $Si_pO_p(R)_{2P}$, where P is an integer ≥2. The residue "R" is an alkyl group, in the simplest case a methyl group.

Polyalkylsiloxanes are distinguished by a particularly high content of silicon per weight fraction, which contributes to the economy of their use in the manufacture of synthetic quartz glass. At the moment octamethylcyclotetrasiloxane (OMCTS) is preferably used because of its large-scale availability in a high purity. This substance is also designated as "D4" according to a notation introduced by General Electric Inc., where "D" represents the group $[(CH_3)_2Si]-0-$.

However, on account of the relatively high boiling temperature and the chemical similarity with other polyalkylcyclosiloxanes, such as hexamethylcyclotrisiloxane (D3), decamethylcyclopentasiloxane (D5), dodecamethylcyclohexasiloxane (D6) and tetradecamethylcycloheptasiloxane (D7), the purification of D4 requires a time-consuming and expensive distillation procedure.

U.S. Pat. No. 5,879,649 A is concerned with such a purification of polyalkylsiloxanes as ti feedstock material for quartz glass production. The publication suggests a two-step distillation process using a carbon filter and a molecular sieve to limit the amount of impurities with boiling temperatures above 250° C. to an amount of less than 14 wt. ppm, preferably to less than 2 wt. ppm. Typically, these high-boiling impurities are components having a mean molecular weight of more than 500 g/mole, and particularly tetradecamethylcycloheptasiloxane (D7) having a boiling point above 276°. It is reported that agglomerates of such high-boiling impurities lead to clogging in the gas supply system and effect "gel formation", thereby producing defects in the quartz glass. The defect mechanism seems here to be the deposition of undecomposed or incompletely decomposed high-boiling agglomerates that will subsequently decompose with release of gases and may lead to bubbles in the quartz glass.

The suggested two-step purifying method is complicated and expensive, and it has been found that, even in the case of an optimized process control, material inhomogeneities arise particularly in the form of thin layers of increased density in the quartz glass.

As an alternative thereto, DE 103 02 914 A1 suggests for the production of synthetic quartz glass with a favorable damaging behavior towards short-wave UV radiation that a mixture of $SiCl_4$ and of an oligomeric silicon compound containing plural Si atoms, such as e.g. a siloxane, should be used as the feedstock material.

The silicon-containing feedstock material can be supplied in liquid form to the consumer, such as e.g. a deposition burner. As a rule, however, the liquid feedstock material is converted by means of a vaporizer into a gaseous or vaporous phase and supplied to the consumer as a continuous gas stream.

A large number of vaporizers are known. A known vaporizer includes a container (a so-called "bubbler") in which the liquid feedstock material is kept and heated by means of a heater to a temperature around the vaporization temperature. A carrier gas is passed through the heated liquid and loaded in this process with the vaporizing feedstock material and supplied under pressure via a pipe system to the reaction zone. The carrier gas is e.g. oxygen. Such a supply of media to a deposition burner for producing synthetic quartz glass by direct vitrification is e.g. described in EP 908 418 A1.

The vaporization rate of the feedstock material depends substantially on the temperature and the residence period of the carrier gas in the liquid phase. Both parameters are influenced by the height of the liquid column and by the supply rate and the flow velocity of the carrier gas. For instance, the size of the carrier gas bubbles in the liquid column has impacts on their rate of ascent in the liquid and thus on the loading with the feedstock material and on the vaporization rate. Changes in the liquid amount have also an impact on the heat transfer. These complex interactions can be handled in the easiest way in that liquid feedstock material is constantly delivered so that the liquid level in the bubbler will not decline.

However, even at a constant liquid level, impurities of a relatively higher boiling point may gradually enrich in the liquid phase with formation of a "sump", so that the composition of the feedstock material arriving at the deposition burner will change over time.

An additional problem will arise in soot deposition methods in which several consumers have to be simultaneously fed with the feedstock material, e.g. in the case of a soot deposition with a multiple burner assembly. To avoid an irregular soot deposition and layer formation, it is here particularly important that each deposition burner has the same soot build-up characteristics in terms of quantity and quality. Variations in the gas supply of the individual deposition burners can be minimized in that these are fed from a common feed tank via a "flow distributor", as is e.g. described in DE 195 01 733 A1. This, however, requires a complicated infrastructure of the media supply.

Another type of vaporizer, as is e.g. described in U.S. Pat. No. 5,356,451 A1, avoids the above-mentioned "sump formation". In this vaporizer a liquid reservoir for the feedstock material is provided inside a vaporization chamber, said reservoir extending along a longitudinal side of the chamber and being filled continuously. If the liquid level exceeds a predetermined overflow height, the liquid will flow off via U-shaped channels out of the storage chamber on the long side towards an inclined plane, thereby forming a thin film thereon. The chamber is heated such that the liquid film has completely vaporized on the inclined plane before the lower end of the inclined plane is reached. It is thereby ensured that the whole liquid, including all impurities, vaporizes at a higher boiling point.

An embodiment of a so-called vertical vaporizer is known from DE 24 35 704 A1. It is suggested therein that the liquid to be vaporized should be heated, supplied to a vertically standing rotation-symmetrical container and sprayed radially against the inner wall of the container with formation of droplets having a diameter of less than 6 mm and that these droplets should be deposited at said place. The vaporous products are removed upwards while the non-vaporized liquid collects in the lower part of the container where it can be removed continuously or from time to time.

The known method works like an additional distillation step during vaporization, wherein constituents of low volatility can be removed via the sump. This results in a higher purity of the vaporized portion of the feedstock material. Yield and throughput are however comparatively low.

TECHNICAL OBJECTIVE

In the known vaporization systems the liquid to be vaporized is brought into contact with a hot surface. Hot surfaces may lead to unforeseen changes, such as e.g. decompositions and polymerizations, especially in the case of organic feedstock material, so that it is not easily discernible to which extent the composition of the vapor still corresponds to that of the liquid. This leads to a certain variability and non-reproducibility in the process control, which may result in defects in the particle formation process and in inhomogeneities in the soot structure. This can particularly be noticed whenever emphasis is laid in the particle formation process on exact compositions of components that are chemically very similar to one another.

Moreover, there is the risk in the described vaporizer systems that ultrafine liquid particles are entrained with the discharged vapor stream, which may also lead to inhomogeneities of the material in the soot body.

The structure of a $SiO_2$ soot body is in general adequately gas-permeable, which is conducive to a uniform gas-phase treatment or sintering. In the area of layers of increased density this is only possible to a limited degree. The reason is that the layers represent diffusion barriers which in drying or sintering processes may produce an irregular treatment result. This problem arises particularly in large-volume $SiO_2$ soot bodies because of long diffusion paths. At the same time, layer areas may particularly show a locally increased content of hydroxyl groups and possibly of chlorine.

These material inhomogeneities of the soot body are noticed in the quartz glass body produced therefrom inter alia in the form of axial, radial or azimuthal variations of the hydroxyl-group or chlorine concentration or the viscosity values, and they result in unfavorable properties in the final product.

It is the object of the present invention to provide a method for producing $SiO_2$ soot bodies of high material homogeneity, in which the said drawbacks are avoided, particularly to provide a method that permits the manufacture of $SiO_2$ soot bodies of high material homogeneity, particularly in large-volume cylindrical soot bodies having outer diameters of more than 300 mm.

GENERAL DESCRIPTION OF THE INVENTION

To achieve this object, a method is suggested comprising the features of patent claim 1. Preferred developments are listed in each of the dependent claims.

This object, starting from the aforementioned method, is achieved according to the invention in that the liquid $SiO_2$ feedstock material contains at least one additional component of the polyalkylsiloxane D3 with a weight fraction mD3 and an additional component of the polyalkylsiloxane D5 with a weight fraction mD5 in a weight ratio mD3/mD5 in a range between 0.01 and 1, and the liquid $SiO_2$ feedstock material provided is vaporized while maintaining the weight ratio mD3/mD5 and at at least 99% by wt. into the gaseous $SiO_2$ feedstock vapor.

In contrast to the known methods in which a feedstock material is used that consists of a single defined silicon compound of the highest purity possible, the present invention suggests a $SiO_2$ feedstock material that is present as a mixture of different polyalkylsiloxanes. Octamethylcyclotetrasiloxane (here also called D4) forms the main component of the mixture. In addition to D4, the mixture contains chemically similar polyalkylsiloxanes, namely those with a smaller molecular mass than D4 (including D3) and also those with a greater molecular mass than D4 (including D5). Thus the additional constituents of the feedstock material which are summarized under the term "additional components" have molecular masses and boiling temperatures that differ both upwards and downwards from the relative molecular mass of D4 (about 297 g/mol) and in the boiling temperature of D4 (about 175° C.).

In essence, the method according to the invention is distinguished by two cooperating features. The first feature is that the liquid $SiO_2$ feedstock material, hereinafter also called feedstock material, comprises two further polyalkylsiloxanes apart from the primarily existing D4. These are the additional components D3 and D5. The ratio of the amounts of D3 and D5 in the liquid $SiO_2$ feedstock material is not arbitrary, but is selected within a predefined range. Within the scope of the second essential feature the method according to the invention requires a complete conversion of the liquid $SiO_2$ feedstock material—and thus also of the weight fraction mD3 and mD5—into the gas phase. Hence, it is not only the liquid that has a predetermined and narrowly defined ratio of D3 and D5, but also the gaseous $SiO_2$ feedstock vapor, hereinafter also called feedstock vapor. With the help of the method according to the invention it is possible to obtain $SiO_2$ soot bodies and quartz glass bodies that exhibit a particularly high material homogeneity which exceeds the presently common standard. The advantages of the method can be explained in that a stronger variation, which takes place on a microscopic scale, in the sizes of the produced $SiO_2$ particles, viz. the broadening of the particle size distribution, results in a reduction of the variation of the macroscopically measured density within the $SiO_2$ soot body.

Within the scope of the invention the term "weight fraction" describes a relative value that ensues from the mass of the respective additional component in relation to the total mass of the liquid $SiO_2$ feedstock material. The weight ratio mD3/mD5 of the two weight fractions of the additional components is thus a dimensionless value that can be determined by division of the two relative weight fractions.

Within the scope of the invention the term dew point describes the temperature at which an equilibrium state of condensing and evaporating liquid is obtained.

Within the scope of the invention the statement that vaporization takes place "while maintaining the weight ratio" means that a ratio of the weight ratio G_liquid=mD3/mD5 of the liquid $SiO_2$ feedstock material and of the weight ratio G_vapor=mD3/mD5 of the gaseous $SiO_2$ feedstock vapor has a value of $\pm 5 \times 10^{-4}$ at the most, preferably $\pm 2 \times 10^{-4}$ at the most, particularly preferably $\pm 1 \times 10^{-4}$ at the most, particularly $\pm 5 \times 10^{-5}$ at the most. The ratio τ is here calculated as follows:

$$\tau = (G\_liquid - G\_vapor)/G\_liquid.$$

Hence, the weight ratio, i.e. the ratio of the fraction D3 to the fraction D5, should not be changed by the vaporizing process such that the ratio is shifted by more than +500 ppm at the most, preferably ±250 ppm at the most, particularly preferably ±100 ppm at the most.

With the scope of the invention the statement that "the liquid $SiO_2$ feedstock material is vaporized at at least 99 weight percent into the gaseous $SiO_2$ feedstock vapor" means that at least 99 weight percent of the liquid $SiO_2$ feedstock material entering the vaporizing process are also converted into the gas phase. It is the aim of the method according to the invention that the liquid feedstock material is completely converted into the gas phase. The gaseous $SiO_2$ feedstock vapor achieved thereby is then to be converted by means of oxidation and/or pyrolysis and/or hydrolysis into $SiO_2$ particles. With the effort to achieve a complete conversion of the feedstock material into the feedstock vapor, i.e. a conversion of at least 99% weight percent (also called % by wt.), the weight ratio of D3 to D5 is also transferred from the liquid phase into the gas phase. These efforts ensure that the $SiO_2$ feedstock vapor has a predetermined ratio between D3 and D5, for it is only if the weight ratio mD3/mD5 is within a predetermined range that it is possible to produce $SiO_2$ soot bodies and thus quartz glass that are distinguished by a particular homogeneity. A haphazardly mixed polyalkylsiloxane mixture which has weight fractions of D3 and D5 that differ from the claimed range does not permit the production of quartz glass of such a unique homogeneity. A particularly preferred configuration variant is distinguished in that liquid $SiO_2$ feedstock material is converted into the $SiO_2$ feedstock vapor, except for a remaining fraction of less than 20 parts per million (hereinafter ppm), preferably less than 10 ppm, particularly preferably less than 5 ppm. This configuration variant can be implemented by means of the vaporization methods as are here disclosed. These vaporization methods, particularly the combination of the vaporization due to a pressure drop and a decrease in the dew point, make it possible that of the $SiO_2$ feedstock material introduced in liquid form into the vaporizer, only very small fractions (less than 20 ppm, preferably less than 10 ppm, particularly preferably less than 5 ppm) do not vaporize. In individual tests the fraction of non-vaporized $SiO_2$ feedstock material could even be reduced to less than 2.5 ppm.

Within the scope of the invention the term polyalkylsiloxane comprises both linear and cyclic molecular structures. It is however preferred when the polyalkylsiloxanes of the $SiO_2$ feedstock material comprise at least three polymethylcyclosiloxanes, selected from the group consisting of hexamethylcyclotrisiloxane (D3), octamethylcyclotetrasiloxane (D4), decamethylcyclopentasiloxane (D5), dodecamethylcyclohexasiloxane (D6). The notation D3, D4, D6 derives from a notation introduced by General Electric Inc., wherein "D" represents the group [$(CH_3)_2Si$]-0-. In a preferred variant, the main component is the polyalkylsiloxane base substance D4. For instance the portion of D4 of the polyalkylsiloxane base substance is at least 70% by wt., particularly at least 80% by wt., preferably at least 90% by wt., particularly preferably at least 94% by wt.

Within the scope of the invention the terms diluent and carrier gas are used as synonyms.

A configuration of the method is distinguished in that the ratio mD3/mD5 is in the range between 0.1 and 0.5. The measurements taken have surprisingly confirmed that only within a comparatively small range the addition of D3 and D5 to the $SiO_2$ feedstock material, which is mainly composed of D4, achieves a significant reduction of the inhomogeneities in the density of the quartz glass. It could be determined in a multitude of measurements that especially at a ratio of the masses of the additional components mD3 to mD5 between 0.1 and 0.5 the soot body and thus also the quartz glass made therefrom exhibited hardly any inhomogeneities.

It is essential in the method of the Invention that the $SiO_2$ feedstock material contains at least one additional component with a smaller relative molecular mass than D4 and also at least one additional component with a greater relative molecular mass. It is assumed that during the hydrolytic or pyrolytic decomposition of the polyalkylsiloxanes the activation energy of the oxidative attack or the thermal energy needed for separation is increasing with an increasing molecular mass. The $SiO_2$ feedstock material which is enriched with additional components is supplied to a reaction zone in gaseous form and is decomposed in this process by oxidation and/or hydrolysis and/or pyrolysis into $SiO_2$. The reaction zone is e.g. a burner flame or plasma. In the reaction zone the polyalkylsiloxane molecule is oxidatively decomposed step by step into $SiO_2$, resulting in a $SiO_2$ primary particle to which other SiO— or $SiO_2$ molecules from the gas phase are attached. The attachment process will end on the way through the reaction zone towards a deposition surface as soon as the agglomerated or aggregated $SiO_2$ particle enters into a zone in which there are no longer any other undecomposed molecules available.

These separation, oxidation and attachment processes (hereinafter also summarized under the term "particle formation process") take place with different kinetics and at different temperatures, depending on the molecular mass and size of the polyalkylsiloxane molecule. As a consequence, agglomerates and aggregates of different sizes with a comparatively broad particle size distribution are formed in the reaction zone. The particle formation process is changing during use of the method according to the invention. In comparison with the use of pure D4 a broader distribution of the sizes of the evolving $SiO_2$ particles and together with this a change in the soot body structure can be observed. A possible explanation for the broadening of the particle size distribution is that due to the different gas phase kinetics one also obtains different kinetics with respect to the formation of $SiO_2$ primary particles on which further growth can take place due to the attachment of further $SiO_2$ molecules from the gas phase. Another possible explanation is that already the size of the $SiO_2$ primary particles and thus with this also the size of the $SiO_2$ particles evolving therefrom and their concentration in the reaction zone are changing during hydrolysis or pyrolysis in response to the number and configuration of the silicon atoms of the polyalkylsiloxane molecule.

Due to the manufacturing process soot bodies show a certain layer structure, the layers representing regions of local changes in the density or the chemical composition. It has been found that the use of a $SiO_2$ feedstock material according to the invention yields a $SiO_2$ soot body with a surprisingly high homogeneity, particularly with a uniform and weak characteristic of the layer structure. This effect can be ascribed to the fact that the broadening of the size distribution of the formed and depositing $SiO_2$ particles either leads to a more homogeneous deposition of the $SiO_2$ soot than in monodisperse $SiO_2$ particles or that it facilitates a more uniform densification of the $SiO_2$ soot during soot body production or during vitrification.

This effect presupposes that the feedstock material entering the reaction zone contains additional components with molecular masses at both sides of the reference molecular mass of D4, ideally D3 and D5, or the corresponding open-chained homologs. These are molecules with a similar molecular mass and with a chemical similarity with D4. These molecules effect a moderate change in the reaction zone and the particle formation process and a slight flattening of the particle size distribution on condition that the ratio mD3/mD5 of the weight fractions of D3 and D5 is between 0.01 and 1. At ratios outside said limit values the above-described equalization of the deposition process is not noticed.

The method according to the invention includes two principal requirements. On the one hand, the provided liquid $SiO_2$ feedstock material must be converted at at least 99% by wt. into the gas phase. On the other hand, this vaporization process must be configured such that the $SiO_2$ feedstock material vaporizes while maintaining the weight ratio mD3 to mD5. Hence, according to the invention the mass ratio of the two additional components should be substantially congruent in both the liquid phase and the gas phase. It has turned out to be advantageous when a ratio of the weight ratio G_liquid=mD3/mD5 of the liquid $SiO_2$ feedstock material and of the weight ratio G_vapor=mD3/mD5 of the gaseous $SiO_2$ feedstock vapor has a value of not more than $\pm 5 \times 10^{31\ 4}$, preferably not more than $\pm 2 \times 10^{31\ 4}$, particularly preferably not more than $\pm 1 \times 10^{31\ 4}$, the ratio being calculated as follows: (G_liquid−G_vapor)/G_liquid. It has been found that the addition of two further polyalkylsiloxanes D3 and D5 to the main component D4 of the $SiO_2$ feedstock material achieves a broadening of the particle size distribution.

The soot bodies produced according to the prior art and/or the method according to the invention can have a density that is between 25-32% of the density of quartz glass. The achieved density depends inter alia on the distance of the burners from the deposition surface, the set temperature, the stoichiometry of the gases and the geometry of the burners. Different density curves within the soot body, e.g. linear, ascending or descending radial density curves in soot bodies, can be obtained by varying these factors. To analyze the density distributions, the applicant determines the local density of a soot body with known methods at about 700 measurement points. To this end about 50 cross section images are made by means of CT methods, each of the images showing a section transverse to the longitudinal axis of the soot body. To determine the radial density curve, 14 approximately equidistant measurement points are recorded in each of the 50 CT sections. With this method the respective radial density curve can be determined along a sectional area through the soot body and also a density profile along the longitudinal axis of the soot body.

As has been explained, it seems probable that the use of the SiO$_2$ feedstock material leads to a broadening of the particle size distribution. The term particle size distribution is here understood as a frequency distribution for statistically describing the sizes of the individual SiO$_2$ particles. Mathematically, the frequency distribution or particle size distribution is a function which indicates for each occurring value how often this value occurs. At a molecular level SiO$_2$ agglomerates and aggregates of different sizes are created, the size distribution thereof covering a broader range. The size distribution of the soot particles is broader than a size distribution of SiO$_2$ soot particles made from pure D4. The broader particle size distribution makes it possible to form a more uniform fill for the reason that cavities etc. are filled more uniformly. This results in a lower density variation—under macroscopic aspects—within the SiO$_2$ soot body. Thus, the densities determined within the scope of the 700 measurement points reflect the macroscopic result of the microscopically broader particle size distribution.

The mean value of the density M is obtained by forming the mean over all 50 measurement points whose geometric position varies along the longitudinal axis of the soot body, but not their geometrical distance from the central axis. In the case of average soot bodies, 50 cross sections are made through the soot body by way of the computed tomography method, so that the mean value of the density follows from averaging 50 density measurements each time. In general, the mean values of the density are each distributed in a normal way so that a width a can be determined. To determine the radial density profile, 14 measurement points are determined in each of the 50 sections; the radial distance of said points from the center point of the soot body is here increasing. The variance δ of the width a of the mean value M thus contains a statistics of 14 points.

In soot bodies that have or should have a constant density distribution, the mean value M of the density of the soot body and the width σ of the mean value of the densities over 50 measurements can be determined on the basis of the measurement data obtained. The value σ hereby shows how strongly the density varies at a predetermined distance from the deposition surface along the longitudinal axis of the soot body. In addition, it is also possible to calculate the variance δ of the width σ on the basis of the 14 measurement points that were determined for recording the radial profile.

To make the prior art comparable with the measurements carried out according to the invention, several soot bodies were produced and measured. The attempt was made to keep the boundary conditions, such as distance from the burner, burner temperature and stoichiometry, as constant as possible because these have a great influence on the respective density of the soot bodies. Soot bodies were each time produced that had a linear density profile and reached a density between 25% and 32% of the density of quartz glass. When known methods or materials were used, one obtained the following measurement values for the width σ and the variance δ of the density of the soot body:

$\sigma_{StdT}=0.4\%$ and $\delta_{StdT}=0.025\%$.

The values are each indicated in the relative density based on the density of quartz glass.

The use of the additional components D3 and D5 in a SiO$_2$ feedstock material that is otherwise predominantly constituted by D4 leads to a broadening of the particle size distribution. This broadening of the particle size distribution has the effect that the density variations in the soot body get smaller per se. Astonishingly, it has also been found that the variation of the density variations was reduced. One obtained, on average, the following values for the width σ and the variance δ of the density of the soot body:

$\sigma_{inv}=0.37\%$ and $\delta_{inv}=0.023\%$.

In this instance, too, the values are each indicated in the relative density based on the density of quartz glass. The use of the method according to the invention thereby leads to a reduction of the measured density variations by up to 9%. Astonishingly, the variation of the width is also reduced by up to 8%. This reduction of the variation of the variation width of the mean densities results in a much more homogeneous quartz glass than is known in the prior art.

A further advantageous configuration of the method according to the invention is distinguished in that the additional component D3 and/or the additional component D5 make up between 0.5% by wt. and 30% by wt. of a total weight of the liquid SiO$_2$ feedstock material; particularly the sum of the weight fractions mD3+mD5 is in the range between 1% by wt. and 15% by wt., preferably between 1% by wt. and 3% by wt. Surprising measurements have shown that the additional components D3 and D5 need not dominate the SiO$_2$ feedstock material. Rather, admixtures of not more than one third of the total weight are enough to provide a SiO$_2$ feedstock material claimed according to the invention which during its deposition as SiO$_2$ particles leads to a broadening of the particle size and thus to an enhanced homogeneity of the soot body produced thereby. For instance a plurality of measurements have surprisingly demonstrated that even weight fractions between 1% by wt. and 3% by wt. of the additional components D3 and D5 are enough. Already these comparatively small amounts of additional components D3, D5 have the effect on account of the complete conversion into the gas phase that possibly arising density variations in the soot body are covered by the different particle sizes of the SiO$_2$ vapor so that a much more homogeneous soot body or quartz glass body is produced on the whole.

Soot bodies produced according to the prior art have a density of 25-32% based on the density of quartz glass. These soot bodies show a relative variation in the density of 3-4%. These density variations are also transferred into the quartz glass body during vitrification. This leads to radial, azimuthal and axial variations of the hydroxyl groups or chlorine concentrations that may lead to unfavorable properties of the quartz glass cylinder and the quartz glass fibers made therefrom. The method according to the invention is distinguished in that the known density variations in the soot body are reduced. Since this reduction of the density variations has a direct effect on the quality of the quartz glass cylinder, quartz glass cylinders of a correspondingly higher quality and homogeneity were made. This has the advantage that during the later use of the quartz glass cylinders e.g. in the production of optical fibers less rejects are produced. Many of the measurement results indicate that the activation energy of the polyalkylsiloxane D3, which is needed during the decomposition of the polyalkylsiloxanes, is lower than in the case of D4 and in the case of the polysiloxane D5 it is greater than in the case of D4. The activation energy of the polyalkylsiloxane D3 is lower because this molecule has a higher ring tension. Thus, the ring can be opened more rapidly than in the more stable D4. By contrast it becomes evident that the polycyclosiloxane D5 needs more activation energy than D4 for triggering a thermal separation of the molecule. On the whole, however, it was found that the energy difference between D4 and D3 is greater than between D4 and D5. For this reason and since D3 shows a greater tendency towards polymerization reactions, it has turned out to be advantageous when the amount of the additional component D3 is smaller than that of the additional component D5. Thus an advantageous configuration variant of the method according to the invention is distinguished in that the additional components comprise polyalkylcyclosiloxanes and their linear homologs in the following amounts:

hexamethylcyclotrisiloxane (D3): weight fraction mD3 in the range between 0.02% by wt. and 1% by wt.,
decamethylcyclopentasiloxane (D5): weight fraction mD5 in the range between 0.5% by wt. and 5% by wt.

Within the scope of measurements it was surprisingly confirmed that the density variations within the soot body were less than 0.4% when the aforementioned amounts of additional components were used. A further improvement of the density variations of the soot body ensued from the fact that the additional components comprise polyalkylsiloxanes and their linear homologs, respectively, in the following amounts:

hexamethylcyclotrisiloxane (D3): weight fraction mD3 in the range between 0.02% by wt. and 2% by wt.,
decamethylcyclopentasiloxane (D5): weight fraction mD5 in the range between 0.5% by wt. and 10% by wt.

In the measurements, D6 was partly added with a weight fraction mD6 in the range between 0.01% by wt. and 0.75% by wt. This took in general place in exchange for the corresponding amount D5. Dodecamethylcyclohexasiloxane (D6) and its linear homologs effect, however, already in a low concentration, a significant change in the reaction zone and in the particle formation process due to their great molecular mass as compared with D4, so that the weight fraction of D6 is preferably not more than 100 wt. ppm.

It is intended within the scope of the invention that the liquid $SiO_2$ feedstock material is completely converted into the gaseous $SiO_2$ feedstock vapor. This complete conversion is needed so that the weight ratio in the mD3/mD5 of the two additional components D3 and D5 exists not only in the liquid phase, but also in the vaporous phase. It is thereby ensured that not only in the liquid $SiO_2$ feedstock material a lighter polyalkylsiloxane and a heavy polyalkylsiloxane exist in a predetermined weight ratio apart from the reference molecule D4, but also in the gas phase. It is ensured by the high amount of the liquid $SiO_2$ feedstock material converted into the gas phase that the weight ratio mD3/mD5 is maintained. This maintenance of the weight ratio mD3/mD5 from the liquid phase into the gas phase is important for the reason that only an admixture of the additional components D3 and D5 within the claimed range leads to a change in the $SiO_2$ primary particles, by means of which the desired broadening of the particle size distribution can be achieved.

In the known vaporization systems the liquid to be vaporized is brought into contact with a hot surface. Hot surfaces can lead to unforeseeable changes especially in the case of organic feedstock material, e.g. to decompositions or polymerizations, so that it is not readily evident to which degree the composition of the vapor still corresponds to that of the liquid. This results in a certain variability and non-reproducibility in the process control, which may lead to defects in the particle formation process and to inhomogeneities in the soot structure. This will be particularly noticed when exact compositions of components, which are very similar to one another in terms of chemistry, are important in the particle formation process. Moreover, the known vaporizer systems pose the risk that ultrafine liquid droplets are entrained together with the discharged vapor stream, which may also lead to material inhomogeneities in the soot body.

To overcome these drawbacks, a further advantageous configuration of the vaporization process according to the invention consists in that the vaporizing process comprises the following steps:

heating the $SiO_2$ feedstock material,
introducing the heated $SiO_2$ feedstock material into an expansion chamber, so that at least a first part of the $SiO_2$ feedstock material vaporizes due to a pressure drop.

Within the scope of this configuration the $SiO_2$ feedstock material is heated. Temperatures of the $SiO_2$ feedstock material between 150° C. and 230° C. are here desired. Higher temperatures may lead to polymerization. The use of a liquid/liquid heating system has turned out to be advantageous, wherein the $SiO_2$ feedstock material is heated by means of a further liquid, such as oil. A uniform and constant heating of the $SiO_2$ feedstock material takes place by way of a liquid-to-liquid heat exchanger without the formation of any singular hot regions, as is e.g. the case with electric heating wires. Such singular heating points rapidly lead to polymerization reactions that are to be prevented. After the $SiO_2$ feedstock material has been heated, said heated material is injected into the expansion chamber. Inside the expansion chamber the $SiO_2$ feedstock material is converted into the gas phase. It has turned out to be particularly gentle for the $SiO_2$ feedstock material if this vaporizing process takes place as a result of a pressure drop. To this end the $SiO_2$ feedstock material can e.g. be heated as a supercritical liquid. It is only by way of a corresponding pressure inside the heating-up device that a boiling of the $SiO_2$ feedstock material is prevented. During expansion within the expansion chamber the $SiO_2$ feedstock material relaxes such that it passes into the gas phase. Pressure drops between 1.8 and 5 bar have turned out to be advantageous.

The heated pressurized feedstock material is introduced through a supply channel into the expansion chamber and is then nebulized and/or atomized via a corresponding spray head. The said pressure drop can take place directly above the atomizing nozzle and thereby ensure a fast, but uniform transfer of the $SiO_2$ feedstock material into the $SiO_2$ feedstock vapor. Advantageously, the expansion chamber itself is heated to a temperature in the range between 150° C. and 200° C. Although the expansion chamber is not meant to ensure vaporization, the heat which is made available and radiates from the walls of the expansion chamber also into the interior of the expansion chamber supports the vaporizing process as a result of the pressure drop.

The size range of the droplets depends on many parameters. Apart from the rheological properties of the liquid and the geometry of the atomizing nozzle, this is particularly the exit velocity of the liquid out of the atomizing nozzle, which is substantially defined by the pressure difference. Within the said pressure difference range the exiting liquid jet disintegrates into fine drops with a narrow drop size distribution on account of a turbulent flow.

A further advantageous configuration of the vaporization process according to the invention is achieved in that vaporizing comprises the steps of:

heating the $SiO_2$ feedstock material,
introducing the heated $SiO_2$ feedstock material into the expansion chamber,
mixing the $SiO_2$ feedstock material with a heated diluent, so that at least a second part of the $SiO_2$ feedstock material vaporizes due to a decrease in the dew point. Within the scope of this configuration variant, a diluent is used for vaporizing the feedstock material. Advantageously, the diluent is a carrier gas which flows through the expansion chamber. It is for this reason that the term diluent gas and the term carrier gas are regarded as synonyms in the following.

Within the scope of this configuration variant, the $SiO_2$ feedstock material is also heated. As has already been explained, it has turned out to be advantageous when the heating process is carried out by means of a heat exchanger and leads to a heating of the $SiO_2$ feedstock material to a temperature within the range of 120° C. to 230° C. The $SiO_2$ feedstock material is introduced through a corresponding pipe into the expansion chamber and is there atomized and/or sprayed via an atomizing nozzle. To achieve a transition of the $SiO_2$ feedstock material into the $SiO_2$ feedstock vapor that is as uniform as possible, a diluent such as nitrogen should be introduced into the expansion chamber in a direction opposite to the spraying direction of the $SiO_2$ feedstock material. The second part of the liquid $SiO_2$ feedstock material will vaporize upon entry into the expansion chamber because the partial pressure of the liquid $SiO_2$ feedstock material in the chamber is reduced and the dew point thereof will thus also decrease. The special feature of this method is that due to the lowering of the partial pressure the temperature at which the liquid $SiO_2$ feedstock material passes into the gas phase will also be reduced. Depending on the amount of the added and heated carrier gas, the dew point of the $SiO_2$ feedstock material will decrease by up to 30° C. Hence, a very strong heating of the $SiO_2$ feedstock material is not needed in the feed. Apart from nitrogen, argon and helium have also turned out to be useful as carrier gases or diluents. These are gases that show an inert behavior with respect to polyalkylsiloxanes, so that oxidation, polymerization or decomposition reactions between the liquid and the carrier gas, particularly under pressure and at an elevated temperature, and thus a non-reproducible change in the composition of the feedstock material are avoided.

Like in the above-described configuration variant of the vaporizing process by way of pressure drop, vaporization by way of reducing the partial pressure also makes it possible that the vaporization of the liquid $SiO_2$ feedstock material does not take place through metallic surfaces. Such metallic surfaces often exhibit inhomogeneous temperature distributions so that polymerization effects may partly occur on the particularly hot regions. To avoid such regions, it is intended according to the invention that vaporization by way of the partial pressure or the pressure drop already takes place upon entry of the $SiO_2$ feedstock material into the expansion chamber without the liquid passing to the inner walls of the expansion chamber and vaporizing at said place.

A further configuration variant of the method according to the invention is distinguished in that the $SiO_2$ feedstock material is converted due to the pressure drop and/or the reduction of the partial pressure at at least 99.95% by wt., preferably 99.9995% by wt., into the $SiO_2$ feedstock vapor. In an alternative of this configuration the liquid $SiO_2$ feedstock material is transferred into the gas phase only by the pressure drop upon entry of the heated and pressurized $SiO_2$ feedstock material into the expansion chamber. To achieve a complete conversion, it has turned out to be advantageous when the liquid $SiO_2$ feedstock material is atomized into ultrafine droplets. The mean diameter thereof should be smaller than 5 µm, preferably less than 2 µm, particularly preferably less than 1 µm. The liquid feedstock material is thereby converted into a cloud of small droplets that can evenly vaporize due to expansion as a consequence of the pressure drop.

To support this division of the liquid into small droplets, it has turned out to be useful when ultrasonic atomizers are used which due to the action of ultrasound effect a uniform and fine atomization of the $SiO_2$ feedstock material. Within the scope of the invention ultrasound designates a sound with frequencies above the range perceived by humans. This comprises frequencies between 16 kHz and 1.6 GHz. In an ultrasonic atomizer a liquid is atomized without pressure application and without heating. For instance, a piezoceramic wetted with the liquid can be induced to vibrate by means of high-frequency alternating voltage. As a consequence, ultrasonic waves form in the liquid, the maximum strength of said waves being reached at a specific liquid level and said waves effecting the formation of a so-called ultrasonic trunk. Small liquid droplets or aerosols detach from this ultrasonic trunk and can be used for the desired application. The advantage of ultrasonic atomizers lies in the uniform atomization of variable volume flows, the almost constant drop spectrum over the whole volume flow range and the drops' own small velocity, resulting in a good controllability of the jet. Thus, a narrow droplet size distribution can be accomplished in a reproducible manner through ultrasonic atomization, which has a positive effect on the uniformity of the vaporization result.

Within the scope of the second alternative, the conversion of the liquid $SiO_2$ feedstock material into the vapor phase takes place exclusively by use of the carrier gas, with the consequence of the reduction of the partial pressure. Correspondingly sufficient amounts of the diluent/carrier gas must here flow through the expansion chamber and thereby ensure vaporization of the liquid $SiO_2$ feedstock material.

As a third alternative, this configuration variant of the method according to the invention specifies that the liquid feedstock material is vaporized both by using the pressure drop and by lowering the partial pressure. This variant has turned out to be particularly advantageous because large amounts of liquid material have to be vaporized for obtaining quartz glass cylinders with diameters of up to 300 mm. To convert the needed material amounts in a gentle and uniform manner from the liquid phase into the gas phase, it has turned out to be preferred when a $SiO_2$ feedstock material which is overheated at least for partial components is introduced into the expansion chamber and is there transferred by pressure drop and by use of a diluent into the gas phase. This combination of the vaporization process due to a pressure drop and a reduction of the dew point makes it possible that of the $SiO_2$ feedstock material introduced in liquid form into the vaporizer, only very small amounts (less than 20 ppm, preferably less than 10 ppm, particularly preferably less than 5 ppm) do not vaporize. In individual tests the amount of non-vaporized $SiO_2$ feedstock vapor could even be reduced to less than 2.5 ppm.

The liquid $SiO_2$ feedstock material can be transferred more easily and uniformly into the gas phase if the individual amounts to be vaporized are each small and have a large surface. This can optimally be achieved in that the liquid of the $SiO_2$ feedstock material is atomized into fine droplets. The atomized droplets can then be transferred via pressure drop and/or blending with the heated diluent/carrier gas into the gas phase. It has turned out to be advantageous when the contact of the fine droplets with the hot carrier gas takes place in a chamber that is kept at a temperature ranging from 150° C. to 230° C. At a temperature of less than 150° C. there is a certain risk that droplets do not vaporize completely, so that liquid is entrained into the reaction zone, which leads to inhomogeneities in the particle formation process and to defects in the soot body structure, such as bubbles. At a temperature above 230° C., otherwise energetically inhibited reactions with non-reproducible and undesired reaction products, particularly decompositions and polymerization reactions, are more likely.

A further configuration variant of the method according to the invention is distinguished in that the liquid $SiO_2$ feedstock material is converted at room temperature under a defined pressure (e.g. between 1 and 5 bar) in an atomizing nozzle into very small droplets of a few micrometers. A carrier gas (diluent) is first heated via a heat exchanger and mixed with the droplets such that the vaporizing process predominantly takes place in the gas phase and not on hot surfaces. This method can be configured such that the liquid $SiO_2$ feedstock material need not be preheated. In this variant the carrier gas and the liquid $SiO_2$ feedstock material are mixed prior to the atomization proper into droplets.

A further configuration variant of the method according to the invention is distinguished in that upon introduction of the $SiO_2$ feedstock material into the expansion chamber a composition of the $SiO_2$ feedstock material is measured by means of a concentration detector. Within the scope of this configuration the composition, i.e. e.g. the ratio D3, D4 and D5, is directly monitored at the expansion chamber. The supplied $SiO_2$ feedstock material is here analyzed by means of the concentration detector, e.g. a gas chromatographer. A similar analyzing station with a concentration detector can also be arranged at the outlet of the expansion chamber and can determine the composition of the $SiO_2$ feedstock vapor. One or both detectors may be part of a quality management system and send the composition measurement to a computing system where the quality of the added materials and vapors is monitored. Such a permanent monitoring of the composition and the weight fractions of the $SiO_2$ feedstock material ensures that the method according to the invention can be employed at any time and soot bodies can thereby be built up having a variance of the density variations of only $\delta_{inv}=0.023\%$. Extremely homogeneous synthetic quartz glasses can then be produced by vitrification from soot bodies of such a structure.

A further configuration variant of the method according to the invention is distinguished in that forming the stream of the $SiO_2$ feedstock material according to method step (B) comprises generating a first gas stream by vaporizing a mixture of polyalkylsiloxanes containing pure D4, and generating a second gas stream by vaporizing a second mixture of polyalkylsiloxanes substantially containing D3, D4 and D5, and combining the gas streams before or during method step (C). Within the scope of this configuration variant the individual components of the liquid $SiO_2$ feedstock material are vaporized individually. Thus a vaporization of the base material of the $SiO_2$ feedstock material takes place, the base material consisting primarily of D4, wherein in parallel therewith a second mixture of polysiloxane is vaporized that contains the two additional components D3 and D5 in an adequate amount. Subsequently, the two separately produced gas streams are combined to then convert the same into $SiO_2$ particles by oxidation and/or pyrolysis and/or hydrolysis. A corresponding concentration detector can ensure that the composition of the $SiO_2$ feedstock vapor from the two produced gas streams has the desired weight fraction mD3/mD5 within the gaseous $SiO_2$ feedstock vapor. The vaporization of the two partial components of the $SiO_2$ feedstock material can here be carried out by way of different methods and/or at individual temperatures.

The liquid $SiO_2$ feedstock material can be produced by mixing the individual components or by blending component mixtures, or by premature removal from a distillation column or by premature termination of a distillation, as is otherwise standard for the purification of octamethylcyclotetrasiloxane. Hence, in the method according to the invention a purification of octamethylcyclotetrasiloxane can be omitted and, instead of this, a less pure and therefore also cheaper D4 quality can be used. The similar densities and properties of the polyalkylsiloxanes of the feedstock material counteract a separation.

The above limit values for the ratio mD3/mD5 of the weight fractions of D3 and D5 designate the composition of the feedstock material in its liquid phase. During transition into the gas phase the composition of the feedstock material may however change due to decomposition, polymerization or distillation. To avoid this effect, or to keep it as small as possible, a vaporization method is used according to the invention in which the liquid $SiO_2$ feedstock material is first atomized under pressure by means of an injector into fine droplets, and the fine droplets are completely vaporized without any contact with solid, particularly metallic, surfaces and predominantly by contact with a hot carrier gas.

The fine droplets provide a large surface that allows a rapid and efficient, i.e. energy-saving, and above all complete vaporization of the liquid feedstock material. Changes in the composition due to decomposition, polymerization or distillation should thereby be avoided to a substantial degree and a defined composition of the feedstock material supplied to the consumer as well as a reproducible particle formation process are ensured. The combination according to the invention of providing a composition of the $SiO_2$ feedstock material optimized for homogeneous soot formation, on the one hand, and the maintenance thereof during vaporization and the supply to the reaction zone, on the other hand, results in a soot body from which a quartz glass that is distinguished by high material homogeneity and radiation resistance is obtained by sintering or vitrification.

The methods that are here disclosed have the following advantages over conventional known methods: (1) determination of the various fractions of the polyalkylsiloxanes so as to achieve a broadening of the particle size distribution; (2) simplification of the vaporization process because the invention aims at a complete conversion of the liquid feedstock material into the gaseous $SiO_2$ feedstock vapor; and (3) the ability to reduce the vaporization temperature considerably by adding a diluent gas during the vaporization process so as to convert all fractions of the feedstock material into the gas phase without temperature-induced chemical reactions.

Also claimed is the use of a synthetic quartz glass which is produced according to the method as is here disclosed, wherein the synthetic quartz glass is used for the production of optical fibers. The method as is here disclosed permits the production of quartz glass of a very high quality. Due to the low density variations of the soot body, high-quality quartz glasses can be produced that are preferably used for telecommunication fibers, optical fibers.

Further advantages, features and details of the invention become apparent from the sub-claims and the following description, in which with reference to the drawings an embodiment of the invention is described in detail. The features mentioned in the claims and the description can here be essential for the invention, either when taken singly or in any desired combination.

It is known in the prior art to use the polyalkylsiloxane octamethylcyclotetrasiloxane (D4) for producing quartz glass. With the known production methods, however, it is only possible to produce synthetic quartz glasses that have a certain layer structure.

One of the objectives of this invention is to overcome that drawback—regions of local changes in the density and/or the chemical composition. The starting point of the method according to the invention is here the formation of a gas stream from a SiO$_2$ feedstock vapor 107 which contains D4 as the main component. A reference molecular mass is assigned to this polyalkylsiloxane. The gas stream is supplied to a reaction zone in which the SiO$_2$ feedstock vapor is converted into SiO$_2$ under formation of amorphous SiO$_2$ particles by pyrolysis, oxidation or hydrolysis. The subsequent deposition of the amorphous SiO$_2$ particles on a deposition surface 160 leads to the formation of a porous SiO$_2$ soot body 200 which forms a synthetic quartz glass by vitrification. To permit the production of large-volume cylindrical soot bodies 200 with outer diameters of more than 300 mm of improved material homogeneity, the invention discloses that the start material D4 comprises at least two additional components in the form of further polyalkylsiloxanes. These are however not arbitrary polysiloxanes, but a polysiloxane with a molecular mass lower than that of the reference molecular mass of D4, and a polysiloxane which has a molecular mass greater than that of the reference molecular mass of D4. Surprisingly, measurements showed that the use of a heavier and a lighter polyalkylsiloxane in combination with the base material D4 effects a broadening of the particle size distribution of the SiO$_2$ primary particles. In addition, the variation of the width of the particle size distribution is smaller than in comparable methods for producing synthetic quartz glass that use e.g. exclusively D4 or SiCl$_4$.

Figure 1:
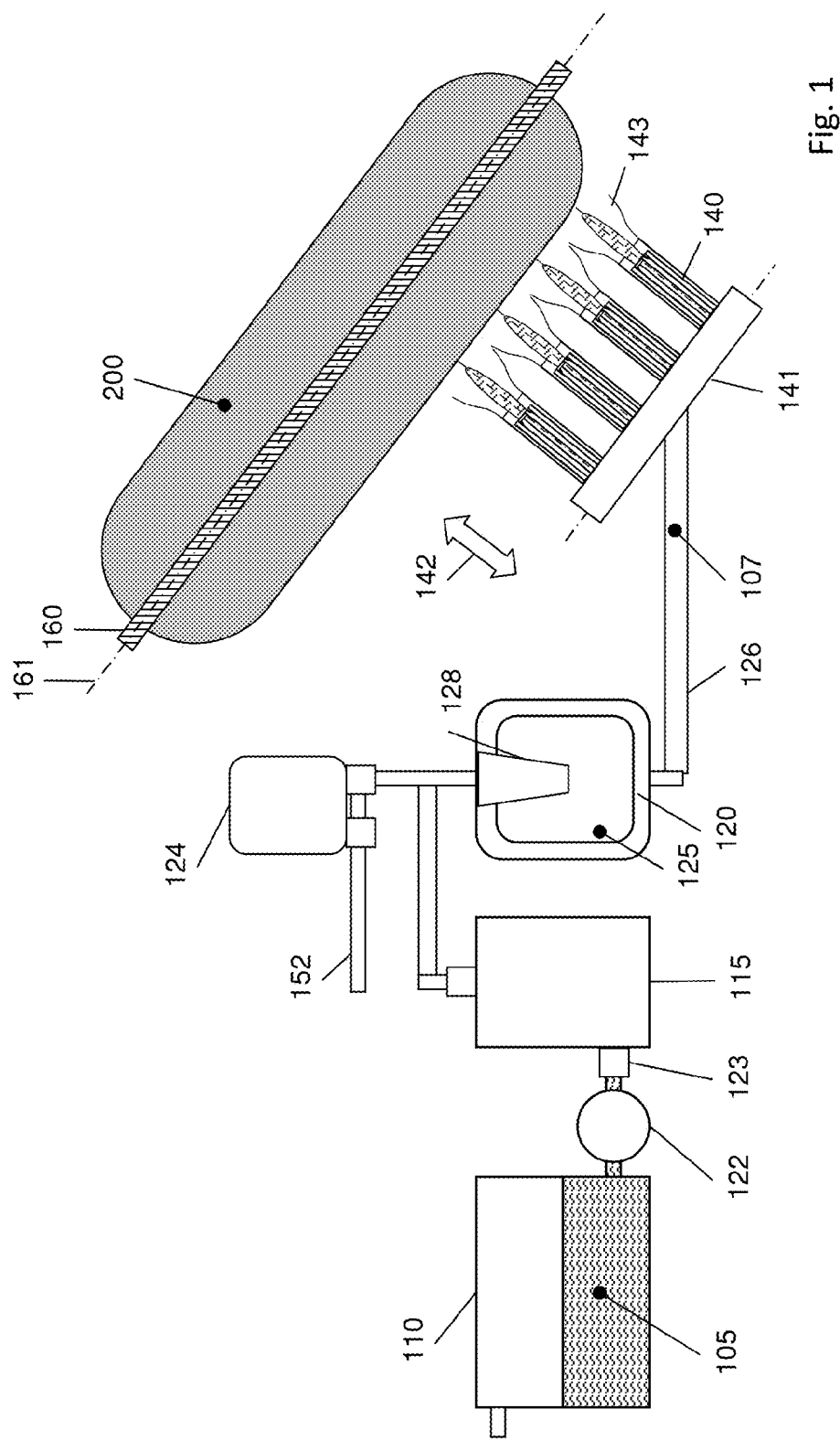
FIG. 1 shows a device for performing the method according to the invention for producing a $SiO_2$ soot body, in a schematic illustration.

The device shown in FIG. 1 serves to produce a SiO$_2$ soot body 200. A plurality of flame hydrolysis burners 140 which are arranged in a row are disposed along a carrier tube 160 of aluminum oxide. In a modification of the method which aims at a higher productivity, a plurality of deposition burners are used instead of only one burner 140 and these are reversingly reciprocated for soot deposition in a joint burner row along the rotating carrier tube, each of the burner flames only sweeping over a sub-length of the carrier tube 160.

The SiO$_2$ feedstock material 105 which is enriched according to the invention with additional components is supplied to the reaction zone in a gaseous form and is thus decomposed by oxidation and/or hydrolysis and/or pyrolysis into SiO$_2$. The reaction zone is e.g. a burner flame or plasma. In the reaction zone SiO$_2$ particles 148 are formed, which are deposited layer by layer on the deposition surface 160 with formation of the SiO$_2$ soot body. The SiO$_2$ particles 148 themselves are present in the form of agglomerates or aggregates of SiO$_2$ primary particles with particle sizes in the nanometer range.

The flame hydrolysis burners 140 are mounted on a joint burner block 141 which is reciprocated in parallel with the longitudinal axis 161 of the carrier tube 160 between two turning points that are stationary with respect to the longitudinal axis 161, and which is displaceable in a direction perpendicular thereto, as outlined by the directional arrows 142. The burners 140 consist of quartz glass; their center-to-center distance is 15 cm.

A corresponding burner flame 143 which forms a reaction zone within the meaning of the invention is assigned to each of the flame hydrolysis burners 140. In the reaction zone SiO$_2$ particles are formed and deposited on the cylinder outer surface of the carrier tube 160 rotating about its longitudinal axis 161, so that a soot body 200 is built up layer by layer with an outer diameter of 350 mm. During the deposition process, a temperature of about 1200° C. is established on the soot body surface 200.

The flame hydrolysis burners 140 are each fed with oxygen and hydrogen as combustion gases and, as feedstock material for the formation of the SiO$_2$ particles, with the SiO$_2$ feedstock vapor 107 which contains a mixture of vaporized polyalkylsiloxanes with the composition as can be seen in Table 1. Within the scope of the invention the term polyalkylsiloxanes comprises both polyalkylcyclosiloxanes and the linear homologs thereof.

The SiO$_2$ feedstock vapor 107 with the polyalkylsiloxane mixture is produced by means of a vaporizer system 120 that comprises a storage container 110 for the liquid mixture, a liquid pump 122, a flow meter 123 for liquid, an MFC (mass flow controller) 124 for the controlled supply of a carrier gas stream 152 of nitrogen, and a double-walled heatable vaporization chamber 125 with an atomizer 128. The storage container 110, a pump 122 and an atomizer 128 are interconnected by means of flexible metallic lines. The storage container 110 is heated to a temperature of 170° C., and the heated liquid is supplied by means of the pump 122 via the flow meter 123 in an exact dosage to the atomizer 128. A concentration detector may here be provided in the connection line between the flow meter 123 and the atomizer 128 for monitoring the composition of the SiO$_2$ feedstock material 105 and/or the SiO$_2$ feedstock vapor 107.

The atomizer 128—also called atomizing nozzle—is an ultrasonic atomizer. Said atomizer is simultaneously fed with a nitrogen carrier gas stream via the MFC 123 at a pressure of 1.5 bar to 5 bar and with the liquid to be vaporized. Said liquid is atomized into fine droplets with a maximum diameter of 1 µm and a small droplet size distribution with a mean diameter ($d_{50}$ value) of 0.7 µm and directly sprayed into the vaporizer 120 in this process. The vaporizer 120 has an internal temperature of 195° C. so that the fine liquid droplets vaporize immediately and the vapor stream is supplied to a stationary flow distributor and distributed by said distributor via heat-insulated flexible media supply lines over the individual deposition burners 140.

A feed line for the combustion gases oxygen and hydrogen and one for an auxiliary gas (oxygen), which is used in the burner flame 143 between the stream of the feedstock material and the stream of the combustion gas and which counteracts premature mixing, also terminate in the flow distributor. Thus combustion gases and SiO$_2$ feedstock vapor 107 are only mixed in the hot zone of the burner flame 143. After completion of the deposition process a tube of porous SiO$_2$ soot (soot tube) is obtained which is subjected to a computed tomography (CT) analysis. The soot tube 200 is irradiated over its length with X-rays. The images obtained thereby permit quantitative and qualitative statements on the intensity and homogeneity of the axial and radial layer structure of the soot tube 200.

TABLE 1

| No. | mD3 | mD5 | mD3 + mD5 | mD3/mD5 | "S" |
|---|---|---|---|---|---|
| 1 | 500 | 50,000 | 50,500 | 0.01 | 0 |
| 2 | 4,600 | 46,000 | 50,600 | 0.1 | ++ |
| 3 | 16,000 | 32,000 | 48,000 | 0.5 | ++ |
| 4 | 25,300 | 25,300 | 50,600 | 1 | ++ |
| 5 | 10,000 | 10,000 | 20,000 | 1 | + |
| 6 | 500 | 500 | 1000 | 1 | 0 |
| 7 | 46,000 | 4,600 | 50,600 | 10 | — |
| 8 | 48,000 | 2,400 | 50,400 | 20 | — |
| 9 | 49,000 | 500 | 49,500 | 100 | — |

Table 1 lists different compositions of the liquid $SiO_2$ feedstock material that were examined within the scope of a plurality of experiments, as well as the quality results that were determined on the respective soot tube. The $SiO_2$ feedstock material consisted predominantly of D4 which had added thereto the corresponding amounts of D3 and D5 by the type of distillation and/or by admixture of polyalkylsiloxanes to the high-purity commercial octamethylcyclotetrasiloxane (D4) and/or further addition of distillation side products. Other impurities, such as heavy polyalkylsiloxanes, e.g. particularly D6, D7, D8, were part of the liquid $SiO_2$ feedstock material at an amount of 500 ppm at the most. As can clearly be seen, admixtures of D5 and D3 with a weight ratio mD3/mD5 in a range between 0.01 and 1, particularly between 0.1 and 1, lead to homogeneous soot bodies and quartz glasses, respectively. If the claimed weight ratios are exceeded or not reached, the number of inhomogeneities will rise and the quality of the synthetic quartz glass will thus decline. For instance, the qualitative results of Table 1 show that when a feedstock material is used in the form of a mixture containing, apart from D4, a suitable quantitative proportion of the polyalkylcyosiloxanes D3 and D5, one will obtain a quartz glass in an economic way that has a uniform layer structure with a minor layer formation.

All concentrations of the polyalkylsiloxanes in Table 1 are indicated in wt. ppm, with the remaining fraction being each time D4 and minor fractions (<500 ppm D6, D7. D8) and unavoidable impurities. The parameter "S" is a qualitative measure of the homogeneity and the intensity of the layer structure detected by way of the CT measurement. The symbols of the qualitative assessment are as follows:

"++" very good.
"+" good,
"0" acceptable,
"–" poor and
"--" very poor.

The entries in the Table illustrate that the weight ratios mD3 to mD5 should advantageously lie in a range between 0.1 and 1. Moreover, the measurements showed that the sum of the weight fractions of the components mD3 and mD5 should preferably lie in a range between 1% by wt. and 6% by wt. to achieve an optimum homogeneity of the quartz glass bodies. Deviations from the selected range and/or the selected sum of the weight fractions lead each to a reduction of the homogeneity of the quartz glass. As illustrated by the values in Table 1, an addition of the two components D3 and D5 with a total weight fraction between 2% by wt. and 6% by weight yields quartz glass with a homogeneity that can be described as very good or good. Particularly marked was the sample having an mD3/mD5 ratio of 0.5. At a total fraction of 48000 ppm=4.8% by wt. of the admixtures by the additional components D3 and D5 in the base material D4, one obtained a quartz glass cylinder which had the least density variations.

Figure 2:
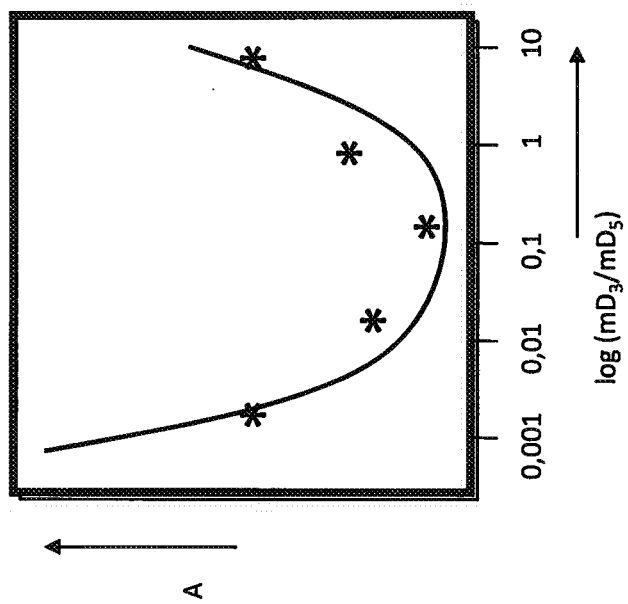
FIG. 2 shows a qualitative analysis of ring structures in soot bodies in dependence upon the composition of the feedstock material in the form of a diagram.

The measurement results listed in Table 1 are also reflected in the diagram of FIG. 2. In the ordinate, the number "A" of the layers in the soot body per length unit (in cm) is plotted, as can be determined from the CT measurements, and in the abscissa the ratio mD3/mD5. It is evident that at an mD3/mD5 ratio of about 0.5 an optimum result is achieved with respect to homogeneity. Clearly visible is the curve of the quality value A following a square function with a plotting in a semi-logarithmic representation as the function of the weight ratio mD3/mD5. It is only possible to implement the advantages according to the invention within a clearly restricted window. Upon variation of the weight ratios beyond the claimed range the advantage determined according to the invention will diminish.

Figure 3:
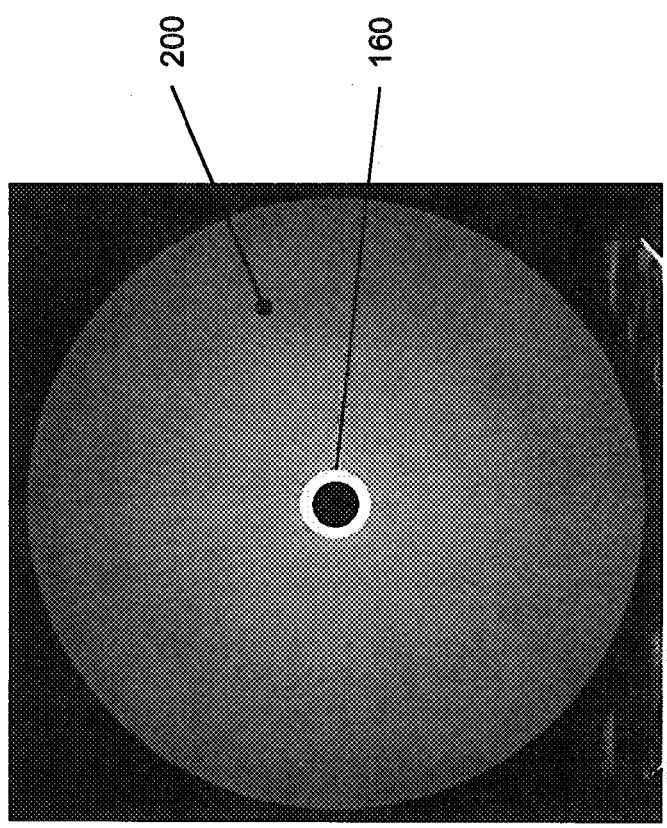
FIG. 3 is a CT image of a soot tube produced according to the invention by using a feedstock material of different polyalkylsiloxanes, in a view taken in the direction of the longitudinal axis of the soot tube.
Figure 4:
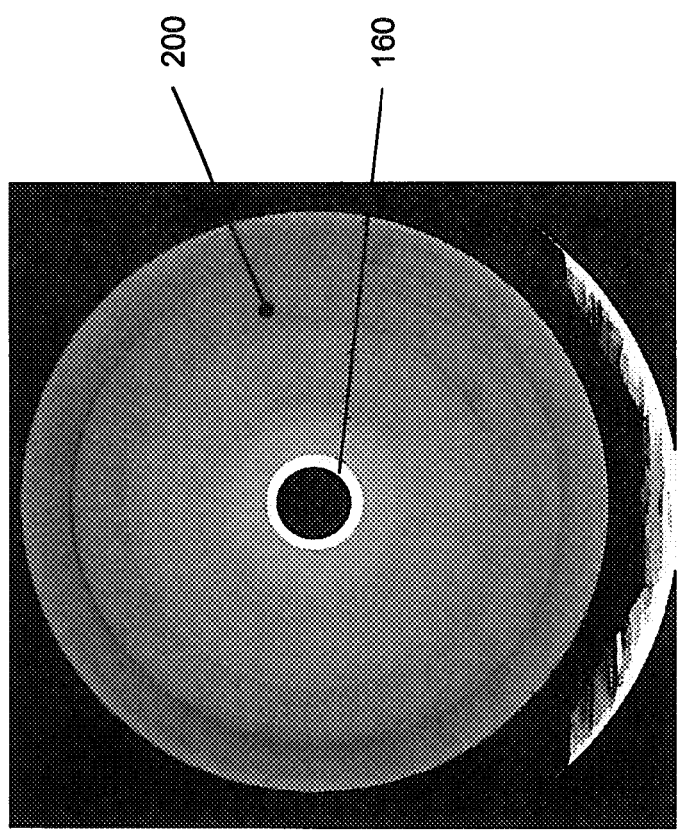
FIG. 4 shows, by way of comparison, a CT image of a SiO$_2$ soot tube produced on the basis of the prior art by using a pure octamethylcyclotetrasiloxane as feedstock material.

FIGS. 3 and 4 show layer images that were made by X-ray computed tomography methods. A cross section through a cylinder-shaped quartz glass body can each time be seen. The section is here made in a direction transverse to the longitudinal axis of the quartz glass body. As explained, the amorphous $SiO_2$ particles are deposited on a deposition surface. Said deposition surface can be seen in each of said FIGS. 3 and 4 as a white ring in the center of the quartz glass body that is otherwise shown in a grayish color. The $SiO_2$ particles are deposited layer by layer under rotation of the rod-shaped deposition surface.

The CT image of FIG. 3 shows the $SiO_2$ soot tube produced by using a $SiO_2$ feedstock material 105 according to sample no. 5 of Table 1. In this imaging technique, regions of a relatively high density are shown as bright surface regions. It is evident that the density is uniformly decreasing from the inside to the outside. Radial layers are hardly visible. By comparison, FIG. 4 shows a CT image of a soot tube produced according to the prior art with a commercial feedstock material. Radially extending layers can be detected by way of brightness differences. The smaller inner diameter in the sample according to FIG. 4 is due to the use of a carrier having a smaller outer diameter in the deposition process for producing the $SiO_2$ soot tube. Density variations can particularly be detected in an easy and clear way by using X-ray radiation for visualizing the cross section of the quartz glass body. It is obvious that the quartz glass body that was produced according to the known method has a plurality of concentrically structured density variation rings. Such types of density variations may have drawbacks particularly when the quartz glass is used for optical fibers.

By contrast. FIG. 3 clearly shows that there are no longer any concentric rings that would hint at density variations. An optical control of the images made by computed tomography already reveals that quartz glass bodies that show a very uniform homogeneity can be produced by using a polysiloxane mixture which contains the additional components D3 and D5 in predetermined amounts and weight ratios. The uniform homogeneity of the quartz glass directly follows from the homogeneous distribution of the $SiO_2$ particles in the soot body. The transition from the $SiO_2$ soot body to the synthetic quartz glass takes place under supply of thermal energy. Within the scope of this method step called vitrification, defects or density variations that are present in the $SiO_2$ soot body manifest themselves in the quartz glass. The use of two additional components leads, as has been explained, to a broadening of the particle size distribution. Thus the variance of the density variations of the soot body can be reduced to only $\delta_{inv}$=0.023%. Such homogeneous $SiO_2$ soot bodies can then be converted into also extremely homogeneous quartz glass bodies by vitrification.

Figure 5:
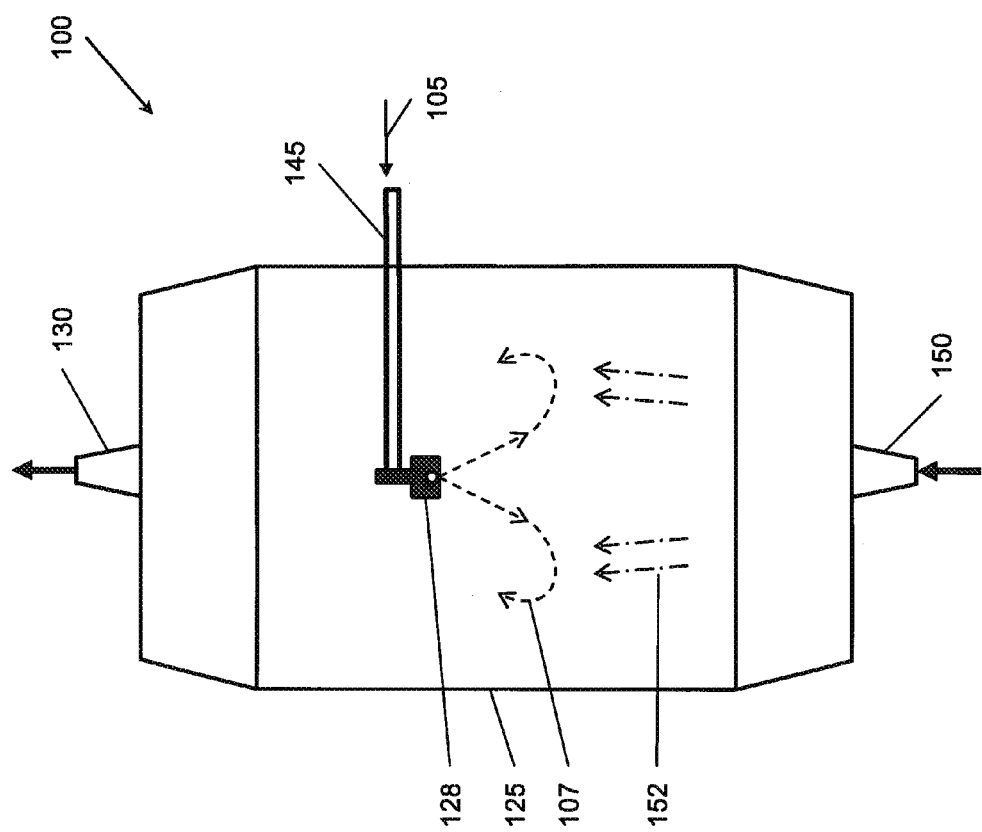
FIG. 5 is a schematic diagram showing the various elements of the quartz-glass producing system according to the invention.

FIG. 5 shows the system 100 for producing quartz glass which uses the method according to the invention. For this purpose the system 100 comprises a storage tank 110 from which the liquid $SiO_2$ feedstock material 105 is pumped by means of a pump (not shown) into a pre-heating device 115. With the help of known methods the liquid $SiO_2$ feedstock material 105 is heated up in the pre-heating device 115 to an elevated temperature. After having flown through the pre-heating device 115, the liquid $SiO_2$ feedstock material 105 is pumped into the expansion chamber 125 of the vaporizer 120. As will still be explained in more detail, the transition of the liquid $SiO_2$ material into the gaseous $SiO_2$ feedstock vapor 107 takes place in the expansion chamber 125. The $SiO_2$ feedstock vapor 107 flows via a line 130 to the burner 140 where a pyrolytic or hydrolytic conversion of the $SiO_2$ feedstock vapor into $SiO_2$ particles takes place.

The pre-heating device 115 has an inlet 116 and an outlet 117. The $SiO_2$ feedstock material 105 is fed through the inlet 116 into the pre-heating device 115. The $SiO_2$ feedstock material 105 is heated within the pre-heating device 115. This can be done by using a hot oil system or an electric heating element in the walls of the pre-heating device. To heat up the liquid $SiO_2$ feedstock material 105 in a uniform manner while avoiding hot regions, it has turned out to be advantageous when the pre-heating device 115 comprises a flow channel which is surrounded by hot oil channels. The liquid-to-liquid heat transfer that can thereby be realized achieves a uniform heating of the liquid $SiO_2$ feedstock material 105. This type of uniform heating ensures that there is no temperature-induced chemical conversion of the D3 or the D5 polyalkylsiloxanes. The heated liquid $SiO_2$ feedstock material 105 is discharged from the pre-heating device 115 into the expansion chamber 125 through a feed line 145.

The expansion chamber 125 defines an inner volume for the free expansion of the $SiO_2$ feedstock vapor. To achieve such a vaporization of the liquid $SiO_2$ feedstock material into the gaseous feedstock vapor, it has turned out to be advantageous when the temperature of the liquid $SiO_2$ feedstock material is raised in the pre-heating device 115 above the boiling point of the $SiO_2$ feedstock material at the operating pressure of the expansion chamber. A preferred operating temperature for the pre-heating device 115 is about 220° C. The boiling point of D4 at atmospheric pressure is about 175° C. To avoid a situation where the liquid $SiO_2$ feedstock material boils at 220° C., a back-pressure is needed in the pre-heating device 115 of about 100 kPa. The liquid reactant is thereby kept as an undercooled (compressed) liquid in the pre-heating device 115.

Figure 6:
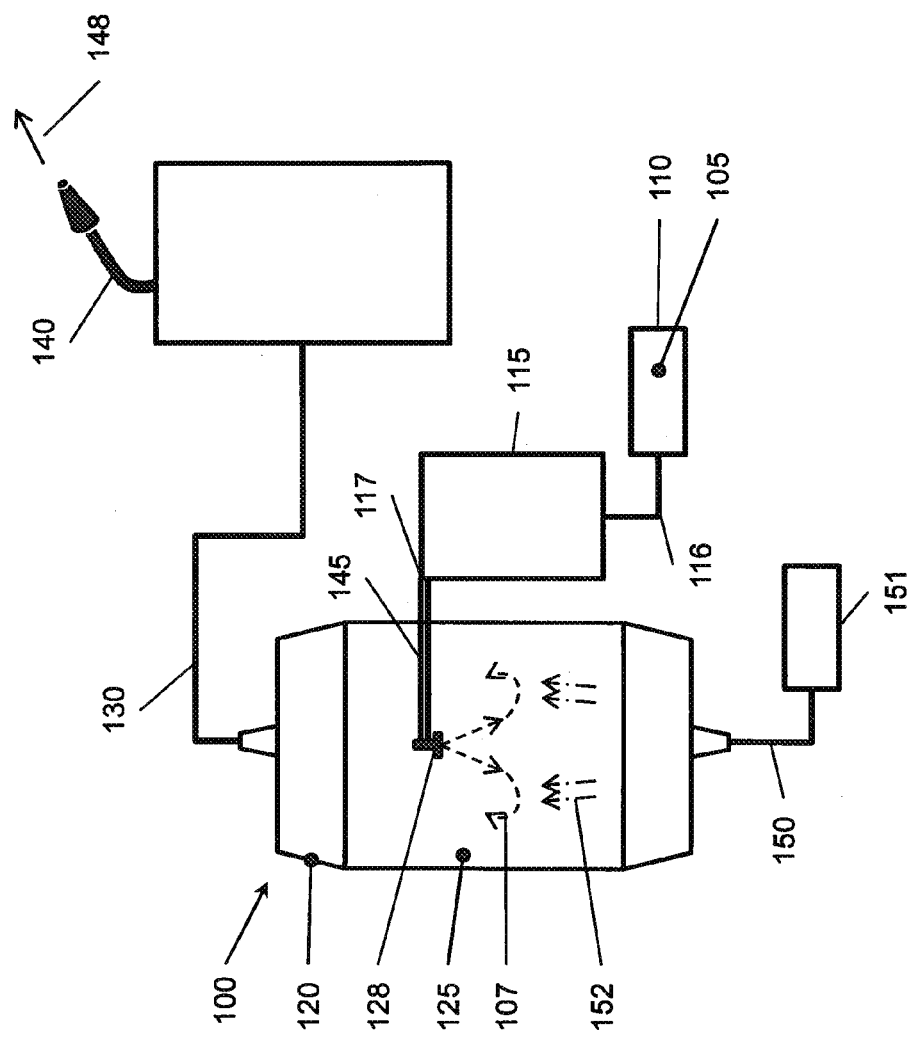
FIG. 6 is a schematic illustration of a vaporization chamber.

As illustrated in FIG. 6, the liquid $SiO_2$ feedstock material flows from the pre-heating device 115 through the feed line 145 into the interior of the expansion chamber 125. The pre-heating device 115 heats the liquid $SiO_2$ feedstock material 105 to an adequate degree, so that it vaporizes almost completely while its pressure drops upon entry into the inner volume of the expansion chamber 125. Such an immediate vaporization will only take place if the pre-heating device 15 has raised the temperature of the liquid $SiO_2$ feedstock material above the boiling point of the $SiO_2$ feedstock material at the operating pressure of the expansion chamber 125. Thus the amount of the $SiO_2$ feedstock material 105 which vaporizes immediately depends on the heating quantity supplied to the liquid $SiO_2$ feedstock material in the pre-heating device 115.

To achieve a particularly uniform and complete vaporization also of the high-boiling portions of the $SiO_2$ feedstock material, it is advantageous when a heated gaseous diluent is additionally introduced into the chamber. The $SiO_2$ feedstock material used according to the invention comprises a plurality of polyalkylsiloxanes, particularly D3, D4 and D5. Each of the said polyalkylsiloxanes has a different boiling temperature. To maintain the weight ratios of the additional components, it is important that the $SiO_2$ feedstock material vaporizes in a uniform way. This requires that the supplied amount of heat and the supplied amount of diluent are so great that even D5, which has the highest boiling temperature, can vaporize. In the pre-heating device 115, heat is supplied to the $SiO_2$ feedstock material to heat the same. At temperatures of about 250° C., however, gels may possibly form in the high-boiling polyalkylsiloxanes, D7, D8 or D9. To prevent those high-boiling elements from forming gels, it is advantageous when within the vaporization process a diluent 152 is supplied, preferably a gaseous diluent heated to the desired vaporization temperature. For this purpose the gaseous diluent 152 may flow through a corresponding media line 150 from a storage container 151 into the expansion chamber 125.

Especially nitrogen has turned out to be advantageous as diluent 152. Other diluents, e.g. argon or helium, can also be used if this is desired. These are gases that show an inert behavior with respect to polyalkylsiloxanes, so that oxidation, polymerization or decomposition reactions between the liquid and the carrier gas, especially under pressure and at elevated temperature, and thus a non-reproducible change in the composition of the feedstock material are avoided. The partial pressure of the liquid $SiO_2$ feedstock material in the expansion chamber 125 is reduced by supplying the diluent, and the dew point thereof is thereby lowered. As a result, the $SiO_2$ feedstock material need not be heated at high temperatures in the pre-heating device 115. Rather, temperatures between 150° C. and 230° C. are enough to ensure a complete conversion of the $SiO_2$ feedstock material into the $SiO_2$ feedstock vapor. It is here the aim that the vaporization of the $SiO_2$ feedstock material comprises an injection phase in which the feedstock material is atomized in liquid form into fine droplets, and a vaporization phase in which the fine droplets are rapidly and efficiently vaporized completely by contact with a hot carrier gas, but without contact with walls.

FIG. 6 illustrates the vaporization according to the invention. The heated-up $SiO_2$ feedstock material 105 is supplied through the feed line 145 to the expansion chamber 125. At the end of the feed line 145 in the interior of the expansion chamber 125, the feed line 145 comprises a nozzle-shaped atomizing nozzle 128. With the help of the atomizing nozzle 128 the liquid $SiO_2$ feedstock material 105 is atomized into fine droplets having a mean diameter of less than one µm, preferably between 0.5 µm and 20 nm ($d_{50}$ value). Due to the pressure drop occurring upon exit out of the atomizing nozzle 128, a substantial part of the liquid feedstock material is transferred into the gas phase. In addition, a nitrogen stream preheated to about 200° C. to about 230° C. is passed through the media line 150 into the expansion chamber 125. Advantageously, the nitrogen stream has a temperature that corresponds substantially, i.e. +/−10° C., to the temperature of the liquid $SiO_2$ feedstock material 105. According to the invention the nitrogen stream flows opposite to the spray direction of the liquid $SiO_2$ feedstock material 105 so as to ensure strong intermixing and adequate heat transfer. Due to the combination of the two vaporization principles, pressure drop and vaporization by means of the gaseous nitrogen, the liquid $SiO_2$ feedstock material 105 is fully converted into the gaseous $SiO_2$ feedstock vapor 107. It is not intended that parts of the liquid $SiO_2$ feedstock material 105 deposit on the walls of the expansion chamber 125 and/or are vaporized thermally at said place. The gaseous $SiO_2$ feedstock vapor 107 flows off through the line 130 to the burner 140. In the burner 140, the $SiO_2$ feedstock vapor 107 is converted by pyrolysis, oxidation or hydrolysis into $SiO_2$ particles 148, also called $SiO_2$ or soot or $SiO_2$ soot.

The size range of the droplets depends on many parameters. Apart from the rheological properties of the liquid and the geometry of the atomizing nozzle 128, these are particularly the exit velocity of the liquid out of the atomizing nozzle, which velocity is substantially determined by the pressure difference. Within the said pressure difference range the exiting liquid jet disintegrates into fine droplets with a narrow droplet size distribution due to the turbulent flow.

In another method variant, it is intended that forming the stream of the $SiO_2$ feedstock material comprises generating a first gas stream by vaporizing a mixture of polyalkylsiloxanes, which contains pure D4, and generating a second gas stream by vaporizing a second mixture of polyalkylsiloxanes, which substantially contains D3, D4 and D5, and combining the gas streams before or during method step (C). The vaporization parameters, such as vaporization temperature and vaporization rate, can be adapted individually to the components to be vaporized and can be optimized by using separate vaporizers for different components of the feedstock material.

As has been shown, it is the objective of the method according to the invention that the liquid $SiO_2$ feedstock material built up of a plurality of polyalkylsiloxanes is completely converted into the gas phase while the weight ratios of the additional components D3 and D5 are maintained. According to our surprising finding the addition of the additional components D3 and D5 into a D4 liquid yields a $SiO_2$ feedstock material by means of which particularly homogeneous $SiO_2$ soot bodies can be built up. Advantageously, the D4 start material only exhibits an impurity of less than 500 ppm, and all polyalkylsiloxanes that are not D3, D4 or D5 are here particularly regarded as impurity.

LIST OF REFERENCE NUMERALS

100 system
105 $SiO_2$ feedstock material
107 $SiO_2$ feedstock vapor
110 storage tank/storage container
115 pre-heating device
116 inlet
117 outlet
120 vaporizer/vaporizer system
122 liquid pump
123 flow meter
124 MFC (mass flow controller)
125 expansion chamber/vaporization chamber
126 line
127 flow distributor
128 atomizing nozzle
130 line
140 burner/flame hydrolysis burner
141 burner block
142 movement of 140
143 burner flame
145 feed line
148 $SiO_2$ soot
150 media line
151 storage container
152 diluent
160 deposition surface/carrier tube
161 longitudinal axis of 160
200 soot body

The invention claimed is:

1. A method for producing synthetic quartz glass, said method comprising:
   (A) providing a liquid $SiO_2$ feedstock material, which contains more than 60% by wt. of octamethylcyclotetrasiloxane (D4),
   (B) vaporizing the liquid $SiO_2$ feedstock material into a gaseous $SO_2$ feedstock vapor,
   (C) converting the gaseous $SiO_2$ feedstock vapor into $SiO_2$ particles,
   (D) depositing the gaseous $SiO_2$ particles on a deposition surface so as to form a $SiO_2$ soot body,
   (E) vitrifying the $SiO_2$ soot body so as to form the synthetic quartz glass,
      wherein the liquid $SiO_2$ feedstock material contains at least one additional component of hexamethylcyclotrisiloxane (D3) present as a weight fraction mD3 and an additional component of decamethylcyclopentasiloxane (D5) present as a weight fraction mD5 in a weight ratio mD3/mD5 in a range between 0.01 and 1, and
      wherein the liquid $SiO_2$ feedstock material provided is vaporized while maintaining the weight ratio mD3/mD5 and the $SiO_2$ feedstock material is vaporized at at least 99.95% by wt. into the gaseous $SiO_2$ feedstock vapor.

2. The method according to claim 1, wherein the ratio mD3/mD5 is in the range between 0.1 and 0.5.

3. The method according to claim 1, wherein D3 and D5 are present in the $SiO_2$ liquid feedstock material and in the gaseous $SiO_2$ feedstock vapor in amounts such that a ratio τ, defined by the equation $$\tau = (G\_liquid - G\_vapor)/G\_liquid$$

wherein G_liquid=mD3/mD5 of the liquid $SiO_2$ feedstock material and G_vapor=mD3'/mD5' of the gaseous $SiO_2$ feedstock vapor where mD3' and mD5' are weight fractions of D3 and D5, respectively, in the gaseous $SiO_2$ feedstock vapor, has a value of not more than $\pm 5 \times 10^{-4}$.

4. The method according to claim 3, wherein the ratio τ has a value of not more $\pm 2.5 \times 10^{-4}$.

5. The method according to claim 3, wherein the ratio t has a value of not more $\pm 1 \times 10^{-4}$.

6. The method according to claim 1, wherein the additional component D3 and/or the additional component D5 make up between 0.5% by wt. and 30% by wt. of a total weight of the liquid $SiO_2$ feedstock material.

7. The method according to claim 6, wherein a sum of the weight fractions mD3+mD5 is in the range between 1% by wt. and 15% by wt.

8. The method according to claim 6, wherein a sum of the weight fractions mD3+mD5 is in the range between 1% by wt. and 3% by wt.

9. The method according to claim 1, wherein that the additional components comprise polyalkylcyclosiloxanes and their respective linear homologs in the following amounts:
   D3 and linear homologs thereof in a weight fraction in a range between 0.02% by wt. and 1% by wt.,
   D5 and linear homologs thereof in a weight fraction in a range between 0.5% by wt. and 5 % by wt.

10. The method according to claim 1, wherein said vaporizing comprises:
    heating the liquid $SiO_2$ feedstock material, and
    introducing the heated $SiO_2$ feedstock material into an expansion chamber, so that at least a first part of the heated $SiO_2$, feedstock material vaporizes due to a pressure drop.

11. The method according to claim 6, wherein said introducing of the heated $SiO_2$ feedstock material into the expansion chamber comprises an injection phase in which the heated $SiO_2$, feedstock material is atomized in liquid form into droplets, the droplets having a mean diameter of less than 5 μm.

12. The method according to claim 11, wherein the mean diameter of the droplets is less than 2 μm.

13. The method according to claim 10, wherein the heated $SiO_2$ feedstock material is converted due to the pressure drop and/or the reduction of the partial pressure at least 99.9995% by wt., into the gaseous $SiO_2$ feedstock vapor.

14. The method according to claim 1, wherein said vaporizing comprises:
heating the liquid $SiO_2$ feedstock material,
introducing the heated $SiO_2$ feedstock material into an expansion chamber, and
mixing the heated $SiO_2$ feedstock material with a heated diluent, so that at least a second part of the heated $SiO_2$ feedstock material vaporizes due to a decrease in the dew point.

15. A method according to claim 1 and further comprising producing an optical fiber from said synthetic quartz glass.

* * * * *